United States Patent
Valkonen et al.

(10) Patent No.: US 9,580,593 B2
(45) Date of Patent: Feb. 28, 2017

(54) FIBER REINFORCED COMPOSITE

(71) Applicant: UPM-Kymmene Corporation, Helsinki (FI)

(72) Inventors: Sanna Valkonen, Lappeenranta (FI); Matthias Baaske, Gross-Zimmern (DE); Sabrina Mehlhase, Weinheim (DE); Roland Klein, Ober-Ramstadt (DE); Markus Biesalski, Reinheim (DE); Matthias Rehahn, Fuerth im Odenwald (DE); Michael Duetsch, Traunstein (DE); Okko Ringena, Neusäss (DE)

(73) Assignee: UPM-KYMMENE CORPORATION, Helsinki (FI)

( * ) Notice: Subject to any disclaimer, the term of this patent is extended or adjusted under 35 U.S.C. 154(b) by 0 days.

(21) Appl. No.: 14/890,068

(22) PCT Filed: May 15, 2014

(86) PCT No.: PCT/FI2014/050369
§ 371 (c)(1),
(2) Date: Nov. 9, 2015

(87) PCT Pub. No.: WO2014/184444
PCT Pub. Date: Nov. 20, 2014

(65) Prior Publication Data
US 2016/0137832 A1    May 19, 2016

(30) Foreign Application Priority Data

May 17, 2013  (FI) .................................. 20135528

(51) Int. Cl.
*C08K 9/00*      (2006.01)
*C08G 63/91*     (2006.01)
(Continued)

(52) U.S. Cl.
CPC ................ *C08L 63/00* (2013.01); *C08H 6/00* (2013.01); *C08K 7/14* (2013.01); *C08L 97/005* (2013.01); *C08L 97/02* (2013.01); *C08L 2205/02* (2013.01)

(58) Field of Classification Search
CPC ........ C08L 63/00; C08L 97/005; C08L 97/02; C08L 2205/02; C08H 6/00; C08K 7/14
(Continued)

(56) References Cited

U.S. PATENT DOCUMENTS

2012/0108798 A1* 5/2012 Wenger .................... C12P 7/10
530/500

FOREIGN PATENT DOCUMENTS

CN      102174160       9/2011
CN      102134305       7/2012
(Continued)

OTHER PUBLICATIONS

Nakazawa et al., JP 2012-224787 A machine translation in English, Nov. 15, 2012.*
(Continued)

*Primary Examiner* — David Karst
(74) *Attorney, Agent, or Firm* — Nixon Peabody LLP; Leena H. Karttunen Contarino; Elizabeth Baio

(57) ABSTRACT

The present invention relates to a fiber reinforced composite comprising a reinforcing constituent of fibers embedded in a resin matrix, wherein the resin matrix comprises epoxy resin crosslinked with aminated lignin. The invention further relates to a method for the production of a fiber reinforced composite.

12 Claims, 2 Drawing Sheets

(51) Int. Cl.
    *C08L 63/00*    (2006.01)
    *C08H 7/00*    (2011.01)
    *C08L 97/00*    (2006.01)
    *C08L 97/02*    (2006.01)
    *C08K 7/14*    (2006.01)

(58) Field of Classification Search
    USPC ........ 523/446, 200; 525/54.2, 523, 534, 540
    See application file for complete search history.

(56) References Cited

FOREIGN PATENT DOCUMENTS

| | | | |
|---|---|---|---|
| JP | H11179725 A | 7/1999 | |
| JP | 2009263549 A | 11/2009 | |
| JP | 2012224787 | 11/2012 | |
| JP | 2012224787 A | * 11/2012 | ............. C08G 59/56 |

OTHER PUBLICATIONS

Khalil, et al, Materials and Design, vol. 3, 2011, pp. 604-610.
Office Action issued in Japanese Patent Application No. 2016-513416 issued Apr. 26, 2016.

* cited by examiner

FIBER REINFORCED COMPOSITE

CROSS-REFERENCE TO RELATED APPLICATIONS

This application is a National Phase Entry Application under 35 U.S.C. 371 of International Application No. PCT/FI2014/050369 filed May 15, 2014, which designates the U.S., and which claims priority to Finnish Provisional Application No. 20135528, filed May 17, 2013, the contents of which are incorporated herein in their entireties.

FIELD OF THE INVENTION

The present invention relates to a new fiber reinforced composite comprising a reinforcing constituent of fibers embedded in a resin matrix. The present invention further relates to a method for producing a fiber reinforced composite.

BACKGROUND OF THE INVENTION

A composite refers to a material consisting of two or more individual constituents. A reinforcing constituent is embedded in a matrix to form the composite. Common composites are composed of glass or carbon fiber in a plastic resin. Natural fibers can also be used. Resins can be of the form of thermoset or thermoplastic materials which each have their own unique properties. Epoxy resins are traditionally used for fiber reinforced composites. However, the epoxy resins require the use of a curing agent. Polyamines can be mentioned as examples of such curing agents for epoxy resins. Commonly used compounds are diethylenetriamine (DETA), triethylenetetramine (TETA), tetraethylenepentamine (TEPA), ethyleneamine etc. There is, however, a need for more sustainable and bio-based curing agents that can be used to replace conventional polyamine curing agents. Prior art recognizes the use of lignin as binder or filler agent mixed with epoxy resin in composites. However, in these composites a conventional polyamine curing agent is required.

The inventors have, however, recognized the need for a method, which would result in a higher replacement level of e.g. petroleum based materials in resin matrixes and thus in a more environmentally friendly fiber reinforced composite.

Purpose of the Invention

The purpose of the invention is to provide a new type of a fiber reinforced composite and a method for producing a fiber reinforced composite. Especially the purpose of the present invention is to provide the use of a more sustainable curing agent to be used in resin composites.

SUMMARY

The fiber reinforced composite according to the present invention is characterized by what is presented in claim 1 or claim 15.

The method according to the present invention is characterized by what is presented in claim 6.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Figure 1:
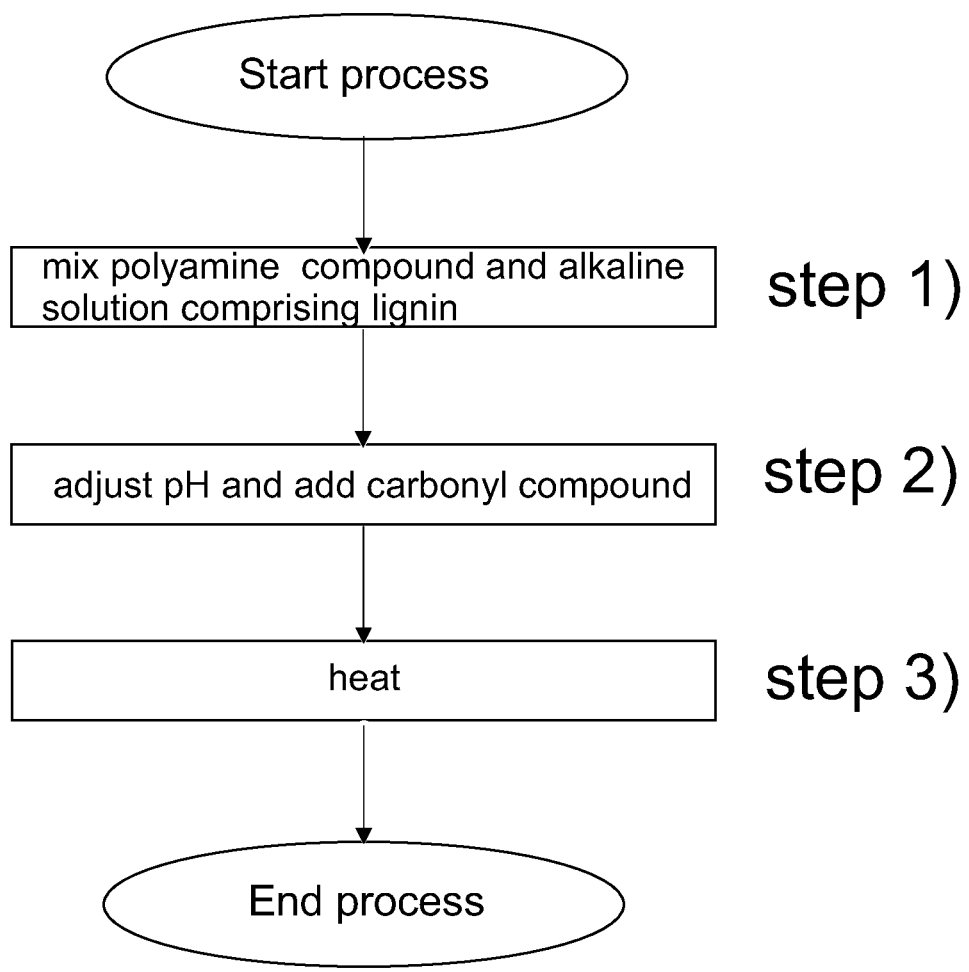
FIG. 1 is a flow chart illustration of a method for aminating lignin according to one embodiment of the present invention.

The present invention relates to a fiber reinforced composite comprising a reinforcing constituent of fibers embedded in a resin matrix, wherein the resin matrix comprises epoxy resin crosslinked with aminated lignin, and wherein the resin matrix contains less than 5 weight-% of lignin based carbohydrates.

Carbohydrates are a group of organic compounds that consist of carbon, hydrogen, and oxygen. Examples of carbohydrates are sugars, cellulose, and hemicellulose.

The expression "lignin based carbohydrates" refers to carbohydrates that originate from the lignin used in the present invention. Lignin can contain carbohydrates bonded or linked to the lignin molecules or as a free impurity. Lignin based carbohydrates are brought to the resin matrix with the lignin that is used in the present invention.

In one embodiment of the present invention the resin matrix contains less than 1.5 weight-%, and preferably less than 1 weight-% of lignin based carbohydrates.

The inventors of the present invention found out that aminated lignin can be used to replace conventional polyamine curing agents for epoxy resins. In this specification, unless otherwise stated, the expression "aminated lignin" should be understood as lignin that has been subjected to an amination reaction with polyamine. The expression "amination", "amination reaction", "amination process" or any other corresponding expression should be understood in this specification, unless otherwise stated, as referring to the process by which at least one amino group is introduced into an organic molecule. In this specification, unless otherwise stated, the expression "polyamine" should be understood as an organic compound comprising two or more primary amino groups —$NH_2$. When purified lignin is used for the amination process the quality of the resulting aminated lignin is essentially uniform. The use of purified lignin has the advantage of resulting in an essentially constant amination reaction without larger variation from one batch to another. As a result of using purified lignin, the formed aminated lignin is essentially pure. By the expression "essentially pure" is to be understood that the aminated lignin contains only minor amounts of impurities such as fiber and woody material.

The use of aminated lignin as a curing agent for the production of fiber reinforced composites results in a more environmentally friendly and sustainable composite. The inventors noted that when aminated lignin is used, crosslinks are formed with epoxy resin increasing the strength of the final fiber reinforced composite. It was found out that aminated lignin is able to efficiently crosslink the resin and bind fibers to the matrix. Without limiting the present invention to any specific theory of why aminated lignin has the advantage of being suitable to be used as a curing agent, it is to be considered that the contact at the interface of e.g. natural fibers and the epoxy resin is improved when using aminated lignin compared to lignin that has not been subjected to amination reaction.

The inventors found out that aminated lignin as a starting material containing less than 5 weight-% of carbohydrates has the advantage of being essentially pure whereby the properties of the resulting fiber reinforced composite can be readily controlled and a certain purity level of the final composite can be ensured.

In the present invention the resin matrix is formed by using epoxy resin. Epoxy resins are low molecular weight pre-polymers or higher molecular weight polymers which normally contain at least two epoxide groups. Epoxy resins are polymeric or semi-polymeric materials. Epoxy resins can be produced industrially. The raw materials for epoxy resin production are usually petroleum derived, although plant derived sources are also commercially available, e.g. plant derived glycerol is used to make epichlorhydrin. Di-functional and multifunctional epoxy resins such as diglycidyl ether of bisphenol A (DGEBPA), triglycidyl p-amino phenol (TGAP), tetraglycidylether of 4,4'-diaminodiphenyl methane (TGGDDM), and epoxy novolacs can be mentioned as examples of epoxy resins that can be used in the present invention.

In one embodiment of the present invention the epoxy resin is a hot curing epoxy resin. In one embodiment of the present invention the epoxy resin is a cold curing epoxy resin.

In one embodiment of the present invention the fibers are selected from a group consisting of natural fibers, synthetic fibers, and their combination.

In one embodiment of the present invention the fibers are synthetic fibers. In one embodiment of the present invention the synthetic fiber is selected from a group consisting of glass fiber, carbon fiber, Kevlar, and any combination thereof.

In one embodiment of the present invention the fibers are natural fibers. In this specification, unless otherwise stated, the expression "natural fibers" should be understood as fibers originating from a plant, animal or mineral source. In one embodiment of the present invention the natural fiber comprises cellulose. In one embodiment of the present invention the natural fiber is obtained from wood, straw, hemp, flax, kenaf, or any combination thereof.

In one embodiment of the present invention the reinforcing constituent of fibers is in the form of a mat or sheet. The fibers can be oriented or non-oriented in the mat. In one embodiment of the present invention the fibers are mixed into the resin matrix to form an isotropic mixture.

In one embodiment of the present invention the resin matrix further comprises unmodified lignin crosslinked with the aminated lignin. The expression "unmodified lignin", should in this specification, unless otherwise stated, be understood as lignin that has not been subjected to an amination reaction, i.e. unaminated lignin. Unmodified lignin can, in one embodiment of the present invention, be pre-treated, e.g. purified or fractionated before being used in the present invention. The inventors of the present invention found out that unmodified lignin, i.e. lignin that has not been subjected to an amination reaction, could be used to replace part of the epoxy resin needed in the fiber reinforced composite when using aminated lignin as a curing agent. Thus, the ratio of bio-based material in the final composite can be increased.

In one embodiment of the present invention the weight ratio of unmodified lignin to epoxy resin in the fiber reinforced composite is 1:20 to 1:1, and preferably 1:10 to 2:3. In one embodiment of the present invention the weight ratio of aminated lignin to epoxy resin in the fiber reinforced composite is 1:10 to 3:2, and preferably 1:6 to 1:1.

In one embodiment of the present invention the resin matrix comprises additional curing agent crosslinked with epoxy resin. The additional curing agent can be a conventional polyamine curing agent.

The present invention further relates to a method for producing a fiber reinforced composite comprising a reinforcing constituent of fibers embedded in a resin matrix, wherein the method comprises the steps of:

a) forming a resin matrix by mixing epoxy resin and aminated lignin containing less than 5 weight-% of carbohydrates, and mixing the resin matrix with fibers; and b) heating the composition formed in step a) at a temperature of 40-180° C. for crosslinking epoxy resin and aminated lignin.

In one embodiment of the present invention step a) is carried out at a temperature of at most 60° C., and preferably at a temperature of at most 40° C.

In one embodiment of the present invention the aminated lignin contains less than 1.5 weight-%, and preferably less than 1 weight-% of carbohydrates. The amount of carbohydrates present in lignin can be measured by high performance anion exchange chromatography with pulsed amperometric detector (HPAE-PAD) in accordance with standard SCAN-CM 71.

In one embodiment of the present invention heating in step b) is carried out at a temperature of 80-140° C. In one embodiment of the present invention step b) is carried out for 0.5-24 hours.

In one embodiment of the present invention the method further comprises, before step a), the step of forming aminated lignin in the form of a powder. In one embodiment of the present invention step a) of forming a resin matrix comprises dissolving aminated lignin, being in the form of a powder, in epoxy resin. In one embodiment of the present invention step a) of forming a resin matrix comprises dissolving aminated lignin in epoxy resin.

In one embodiment of the present invention aminated lignin is mixed with a solvent, an additional curing agent, a reactive diluent or any combination thereof before being mixed with epoxy resin in step a). Mono- or di-functional aliphatic epoxies such as ortho-crecyl glycidyl ether (CGE), neo-pentyl glycol diglycidyl ether, hexane diol di-glycidyl ether, $C_{12}$-$C_{14}$ alkyl glycidyl ether, and glycerol di-glycidyl ether can be mentioned as examples of reactive diluents.

In one embodiment of the present invention the average molecular weight of the aminated lignin to be used in the present invention is 5000-12000 g/mol, and preferably 7000-10000 g/mol.

The expression "average molecular weight" should be understood in this specification, unless otherwise stated, as weight average molecular weight.

In one embodiment the present invention the substitution level of aminated lignin is 60-95%. In one embodiment the present invention further relates to the curing agent wherein the substitution level of reactive, terminal positions of lignin is 80-100%. The reacted or substituted sites of aminated lignin can be measured by e.g. potentiometric titration or elemental analysis.

In one embodiment of the present invention the amount of bound amino groups in mmol per gram of aminated lignin is 3-10 (mmol/g), as determined by potentiometric titration. The amino groups are bound to lignin. In one embodiment of the present invention the aminated lignin contains essentially no free polyamine compounds. In one embodiment of the present invention aminated lignin contains at least 5 weight-% of bound nitrogen, and preferably 5-20 weight-% of bound nitrogen, as determined by elemental analysis. In one embodiment of the present invention the polydispersity index (PDI) of the aminated lignin is 3-7, as determined by size-exclusion high-performance liquid chromatography (SEC-HPLC). The polydispersity index (PDI), is a measure of the distribution of molecular mass in a given polymer sample. The PDI is calculated as the weight average molecular weight divided by the number average molecular weight. PDI indicates the distribution of individual molecular masses in a batch of polymers.

In one embodiment of the present invention an additional curing agent is used together with aminated lignin in step a) for forming the resin matrix. In one embodiment of the present invention the additional curing agent is a polyamine curing agent. In one embodiment of the present invention the polyamine compound is selected from a group consisting of diethylenetriamine (DETA), triethylenetetramine (TETA), tetraethylenepentamine (TEPA), ethyleneamine, aminoethylpiperazine (AEP), dicyanamide (Dicy), diethyl toluene diamine (DETDA), dipropenediamine (DPDA), diethyleneaminopropylamine (DEAPA), hexamethylenediamine, N-aminoethylpiperazine (N-AEP), menthane diamine (MDA), isophoronediamine (IPDA), m-xylenediamine (m-XDA) and metaphenylene diamine (MPDA).

In one embodiment of the present invention step a) comprises mixing epoxy resin, aminated lignin and unmodified lignin.

In one embodiment of the present invention dry matter content of the unmodified lignin to be used in the present method is at least 95%.

In one embodiment of the present invention the ash percentage of the unmodified lignin is 1.5 weight-% or less. The ash content can be determined by carbonifying and quickly burning a lignin sample so that alkali salts are not melted before the organic matter has been burned (e.g. 20-200° C. for 30 minutes, after which temperature is adjusted to 200-600° C. for 1 h, and thereafter adjusting the temperature to 600-700° C. for 1 hour), and finally the lignin sample is ignited at 700° C. for 1 h. Ash content of a lignin sample refers to the mass that remains of the sample after burning and ignition, and it is presented as percent of the sample's dry content.

In one embodiment of the present invention the unmodified lignin contains less than 5 weight-%, preferably less than 1.5 weight-%, and more preferably less than 1 weight-% of carbohydrates. The amount of carbohydrates present in unmodified lignin can be measured by high performance anion exchange chromatography with pulsed amperometric detector (HPAE-PAD) in accordance with standard SCAN-CM 71.

In one embodiment of the present invention the weight ratio of aminated lignin to epoxy resin is 1:10 to 3:2, and preferably 1:6 to 1:1, in step a). In one embodiment of the present invention the weight ratio of unmodified lignin to epoxy resin is 1:20 to 1:1, and preferably 1:10 to 2:3, in step a).

The fibers can be mixed or combined with the resin matrix by using extrusion, molding, lamination, pultrusion, impregnation a pre-preg process, winding, or any combination thereof.

The present invention further relates to a fiber reinforced composite comprising a reinforcing constituent of fibers embedded in a resin matrix obtainable by the method according to the present invention.

As presented above, aminated lignin is used in the present invention as a curing agent for the epoxy resin, and in some embodiments for the unmodified lignin. Lignin is aminated before being used for the production of the fiber reinforced composite. Thus, in one embodiment of the present invention the method further comprises the step of forming aminated lignin. In one embodiment of the present invention the method further comprises the step of forming aminated lignin in the form of a powder.

In this specification, unless otherwise stated, the expression "lignin" should be understood as lignin originating from any suitable lignin source. The lignin used can be essentially pure lignin. By the expression "essentially pure lignin" should be understood as at least 90% pure lignin, preferably at least 95% pure lignin. In one embodiment of the present invention the essentially pure lignin comprises at most 10%, preferably at most 5%, of other components. Extractives and carbohydrates such as hemicelluloses can be mentioned as examples of such other components.

In one embodiment of the present invention the lignin is selected from a group consisting of kraft lignin, sulfonated lignin, lignosulfonate, sulfomethylated lignin, steam explosion lignin, biorefinery lignin, supercritical separation lignin, hydrolysis lignin, flash precipitated lignin, biomass originating lignin, lignin from alkaline pulping process, lignin from soda process, lignin from organosols pulping and combinations thereof. In one embodiment of the present invention the lignin is wood based lignin. The lignin can originate from softwood, hardwood, annual plants or from a combination thereof.

Different lignin components may have different properties, e.g. molecular weight, molar mass, polydispersity, hemicellulose and extractive contents and compositions.

By "kraft lignin" is to be understood in this specification, unless otherwise stated, lignin that originates from kraft black liquor. Black liquor is an alkaline aqueous solution of lignin residues, hemicellulose, and inorganic chemicals used in a kraft pulping process. The black liquor from the pulping process comprises components originating from different softwood and hardwood species in various proportions. Lignin can be separated from the black liquor by different, techniques including e.g. precipitation and filtration. Lignin usually begins precipitating at pH values below 11-12. Different pH values can be used in order to precipitate lignin fractions with different properties. These lignin fractions differ from each other by molecular weight distribution, e.g. Mw and Mn, polydispersity, hemicellulose and extractive contents. The molar mass of lignin precipitated at a higher pH value is higher than the molar mass of lignin precipitated at a lower pH value. Further, the molecular weight distribution of lignin fraction precipitated at a lower pH value is wider than of lignin fraction precipitated at a higher pH value. Thus the properties of the lignin can be varied depending on the end use.

The precipitated lignin can be purified from inorganic impurities, hemicellulose and wood extractives using acidic washing steps. Further purification can be achieved by filtration.

In one embodiment of the present invention the lignin is flash precipitated lignin. The term "flash precipitated lignin" should be understood in this specification as lignin that has been precipitated from black liquor in a continuous process by decreasing the pH of a black liquor flow, under the influence of an over pressure of 200-1000 kPa, down to the precipitation level of lignin using a carbon dioxide based acidifying agent, preferably carbon dioxide, and by suddenly releasing the pressure for precipitating lignin. The method for producing flash precipitated lignin is disclosed in patent application FI 20106073. The residence time in the above method is under 300 s. The flash precipitated lignin particles, having a particle diameter of less than 2 μm, form agglomerates, which can be separated from black liquor using e.g. filtration. The advantage of the flash precipitated lignin is its higher reactivity compared to normal kraft lignin. The flash precipitated lignin can be purified and/or activated if needed for the further processing.

In one embodiment of the present invention the dry matter content of the lignin, e.g. the flash precipitated lignin, is below 70%, preferably 40-70%, and more preferably 50-60%.

In one embodiment of the present invention the lignin is separated from pure biomass. The separation process can begin with liquidizing the biomass with strong alkali or strong acid followed by a neutralization process. After the alkali treatment the lignin can be precipitated in a similar manner as presented above. In one embodiment of the present invention the separation of lignin from biomass comprises a step of enzyme treatment. The enzyme treatment modifies the lignin to be extracted from biomass. Lignin separated from pure biomass is sulphur-free and thus valuable in further processing.

By "sulfonated lignin" is to be understood in this specification, unless otherwise stated, lignin that can be received as a by-product from the production of wood pulp using sulfite pulping.

In one embodiment of the present invention the lignin is steam explosion lignin. Steam explosion is a pulping and extraction technique that can be applied to wood and other fibrous organic material.

By "biorefinery lignin" is to be understood in this specification, unless otherwise stated, lignin that can be recovered from a refining facility or process where biomass is converted into fuel, chemicals and other materials.

By "supercritical separation lignin" is to be understood in this specification, unless otherwise stated, lignin that can be recovered from biomass using supercritical fluid separation or extraction technique. Supercritical conditions correspond to the temperature and pressure above the critical point for a given substance. In supercritical conditions, distinct liquid and gas phases do not exist. Supercritical water or liquid extraction is a method of decomposing and converting biomass into cellulosic sugar by employing water or liquid under supercritical conditions. The water or liquid, acting as a solvent, extracts sugars from cellulose plant matter and lignin remains as a solid particle.

In one embodiment of the present invention the lignin is hydrolysis lignin. Hydrolysed lignin can be recovered from paper-pulp or wood-chemical processes.

In one embodiment of the present invention the lignin originates from an organosols process. Organosolv is a pulping technique that uses an organic solvent to solubilize lignin and hemicellulose.

In one embodiment of the present invention the lignin selected to be used in the present invention is purified before being aminated. In one embodiment of the present invention purified lignin is used in the method for producing aminated lignin. In one embodiment of the present invention the lignin is purified by dialysis, solvent extraction, nanofiltration, or ultrafiltration. The purification step removes phenolic compounds and part of salts and inorganic compounds, which reduces side reactions during later process steps.

In one embodiment of the present invention the lignin selected to be used in the present invention is fractionated before being subjected to amination reaction. By fractionation of lignin, small phenolic components can be reduced or excluded from lignin. In one embodiment of the present invention, the selected lignin is purified to remove at least 70% of low molecular weight lignin. By the expression "low molecular weight lignin" should be understood as lignin having an average molecular weight of 1000-3000 g/mol, and preferably 1500-2500 g/mol. The average molecular weight of lignin can be measured using high pressure size-exclusion chromatography (HP-SEC). The removal of low molecular weight lignin makes the amination reaction more efficient by reducing unwanted side reactions. Low molecular weight lignin is more reactive than high molecular weight lignin and thus more easily causes side reactions. Furthermore, the amination process is easier to control in the absence of low molecular weight lignin. It is to be considered that controlling the amination reaction is facilitated because the source material is more homogenous.

The lignin selected to be used in the present invention can be aminated by any method that is suitable to produce aminated lignin having properties allowing it to be used as a curing agent. In one embodiment of the present invention lignin is aminated by a method, which comprises the steps of:

a) mixing a polyamine compound with an alkaline solution, wherein lignin having an average molecular weight of 3000-15000 g/mol, preferably 3500-15000 g/mol, more preferably 4000-10000, and even more preferably 5000-8000 g/mol, is dissolved;

b) decreasing the pH of the solution formed in step a) by at least 0.5 pH units, with the proviso that the pH is decreased at least to the value of 12, and preferably the pH is decreased to 10.5-11.5, and mixing the solution with a carbonyl compound; and c) heating the solution formed in step b) for forming aminated lignin.

In one embodiment of the present invention the alkaline solution comprises a hydroxide of an alkali metal, such as sodium hydroxide and potassium hydroxide. In one embodiment of the present invention the pH of the alkaline solution in step a) is above 12, preferably 12.5-14, more preferably 12.8-14, even more preferably 12.5-13.5, and most preferably about 13. In one embodiment of the present invention the polyamine compound is selected from a group consisting of diethylenetriamine (DETA), triethylenetetramine (TETA), tetraethylenepentamine (TEPA), ethyleneamine, aminoethylpiperazine (AEP), dicyanamide (Dicy), diethyl toluene diamine (DETDA), dipropenediamine (DPDA), diethyleneaminopropylamine (DEAPA), hexamethylenediamine, N-aminoethylpiperazine (N-AEP), menthane diamine (MDA), isophoronediamine (IPDA), m-xylenediamine (m-XDA) and metaphenylene diamine (MPDA).

The expression "carbonyl compound" should be understood in this specification as a compound comprising a carbonyl group. A carbonyl group contains a carbon-oxygen double bond. Aldehydes and ketones are carbonyl compounds. The carbonyl compound can be an aldehyde. In one embodiment of the present invention the aldehyde is selected from a group consisting of paraformaldehyde, formaldehyde, glyoxal, and any combination thereof. The solution can be heated in step c) at a temperature of 50-100° C., and preferably at a temperature of 70-95° C. for 1-24 hours, preferably 2-16 hours, and more preferably 3-6 hours. In one embodiment of the present invention the pH is adjusted in step b) by using a protic acid, such as hydrochloric acid (HCl), sulphuric acid ($H_2SO_4$), nitric acid ($HNO_3$), or phosphoric acid ($H_3PO_4$).

The embodiments of the invention described hereinbefore may be used in any combination with each other. Several of the embodiments may be combined together to form a further embodiment of the invention. A composite or a method to which the invention is related, may comprise at least one of the embodiments of the invention described hereinbefore.

An advantage of the present invention is that a fiber reinforced composite with increased ratio of bio-based materials compared to traditional composites can be produced. An advantage of the present invention is that a bio-based curing agent can be used in a similar manner as conventional petroleum based curing agents for epoxy resins. Similar kinds of composite properties can be achieved with the aminated lignin as curing agent as with conventional polyamine curing agents.

An advantage of the present invention is that the use of aminated lignin as a curing agent for the resin matrix allows replacing part of the epoxy resin needed with unmodified lignin, whereby the ratio of bio-based materials in the resulting composite is even further increased compared to fiber reinforced composites produced from petroleum based materials.

An advantage of the present invention is that lignin is a readily available and inexpensive source material.

EXAMPLES

Reference will now be made in detail to the embodiments of the present invention, an example of which is illustrated in the accompanying drawing.

The description below discloses some embodiments of the invention in such a detail that a person skilled in the art is able to utilize the invention based on the disclosure. Not all steps of the embodiments are discussed in detail, as many of the steps will be obvious for the person skilled in the art based on this specification.

FIG. 1 illustrates a method according to one embodiment of the present invention for producing aminated lignin.

Before forming an alkaline solution comprising lignin, the source of components, and especially the source of lignin, is chosen. As presented above, lignin can be selected from e.g. kraft lignin, sulfonated lignin, steam explosion lignin, biorefinery lignin, supercritical separation lignin, hydrolysis lignin, flash precipitated lignin, biomass originating lignin, lignin from alkaline pulping process, lignin from soda process and combinations thereof. The selected lignin is firstly purified e.g. by dialysis or ultrafiltration, whereby small phenolic components and part of salts and inorganic compounds are being removed, which reduces side reactions. Also the other components and their amounts to be used in the amination reaction are selected.

Following the various preparations and pre-treatments, in the embodiment of the present invention shown in FIG. 1, step 1) is carried out. The lignin is dissolved in an alkaline solution. The pH of the solution in step a) can be e.g. 12.5-13.5. A polyamine compound is added thereto.

After step 1), step 2) is carried out, i.e. the pH of the solution is decreased by at least 0.5 pH units, however, at least to the pH value of 12 or below, after which a carbonyl compound is mixed therein. The formed solution is heated in step 3) at a temperature of 85-90° C. for 3-6 hours for allowing the lignin to react and aminated lignin to form. The aminated lignin formed in accordance with the embodiment presented in FIG. 1 can further be purified and e.g. dried resulting in a powder being formed.

Figure 2:
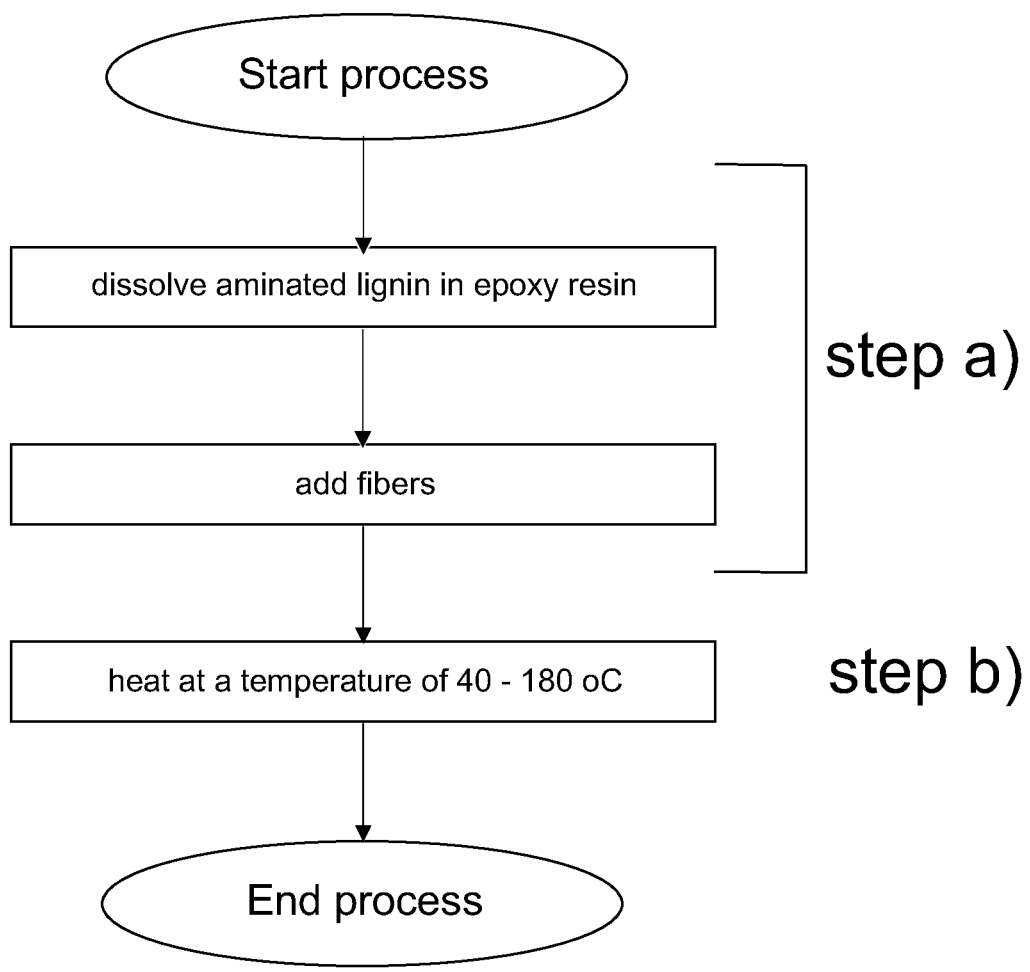
FIG. 2 is a flow chart illustration of a method for producing a fiber reinforced composite according to one embodiment of the present invention.

FIG. 2 illustrates one embodiment of the present invention for producing a fiber reinforced composite according to the present invention.

The aminated lignin formed in accordance with the embodiment presented in FIG. 1 is dispersed or mixed in epoxy resin, in step a). Fibers such as wood based fibers, are added to the reaction mixture, after which the reaction mixture is heated at a temperature of 40-180° C. for allowing epoxy resin to form crosslinks with aminated lignin.

Example 1

Preparing Aminated Lignin

In this example lignin was aminated according to the embodiment of the present invention shown in FIG. 1.

Before performing the amination reaction the lignin used in this example, Standard Kraft Lignin (SKL), was purified in accordance with the following procedure: 5 g of SKL was dissolved in 50 ml of 0.1 M NaOH solution and purified via dialysis (dialysis-tube: 3500 nominal molecular weight limit (NMWL)) in 1.5 l of water, which was changed three times every eight hours for 24 hours. Thereafter, the SKL was freeze-dried to give a fluffy brown powder of purified SKL (pSKL) (yield: 4.1 g, 82%).

The purified lignin was then treated in the following manner: 1.6 g of purified SKL was dissolved in 100 ml of 0.5 M of NaOH-solution in a 250 ml 3-necked-flask with dimroth-cooler and dropping funnel (pH=13.3, adapting temperature (aT)=22.9° C.). Then 3.3 ml (3.17 g, 30.7 mmol) of diethylenetriamine (DETA) was added dropwise (pH=13.3). Under constant stirring the pH value was decreased to pH=11-11.2 by adding concentrated HCl solution (aT=29.1° C.). After five minutes of stirring, 0.8 ml (3.46 g, 29.2 mmol) of $CH_2O$-solution (37% in water) was added dropwise over a period of 15 minutes and then the solution was heated to 90° C. and stirred under constant temperature for 16 hours for preparing aminated lignin.

After cooling down to room temperature, the 100 ml solution was dialysed (dialysis tube: 3500 NMWL) in 1.5 l of water, which was changed three times every eight hours for 24 hours and freeze-dried to yield a strong hygroscopic fluffy, light brown powder (yield: 1.90 g).

The molecular weight of aminated lignin produced in line with example 1 was determined using a high-performance size-exclusion chromatography (SEC). Detection of lignin was made using UV-detector PDA-100 at the wavelength of 280 nm. This UV-detector is sensitive for components originating from aromatic lignin based material.

A solid lignin sample was dried overnight in an oven at a temperature of 105° C. 10 g of dried lignin was weighed and transferred into a 10 ml volumetric flask. The lignin sample was fully dissolved in 0.1 M (1 mg/ml) sodium hydroxide (NaOH). Before performing the chromatography, the lignin solution was filtrated through a 0.45 µM filter.

The molecular weight of aminated lignin was determined using a high-performance size-exclusion chromatography as follows:

Two parallel measurements were carried out. 0.1 M NaOH was used as an eluent. The calibration was done using Na-polystyrene sulfonate standards having a molecular weight of 1100-73900 g/mol. For quality control, standard quality kraft lignin and PSS molecular weight standard were used. The columns used were PSS MCX precolumns, 1000 Å and 100 000 Å separation columns filled with sulfonated styrene-divinylbenzene copolymer matrix. Isocratic run program was used. The run time was 45 minutes. The injection volume was 50 µl. The flux was 0.5 ml per minute. The temperature was 25° C. As a result of the chromatography, number average molecular weight $M_n$, weight average molecular weight $M_w$, peak molecular weight $M_p$ and polydispersity index PDI values can be reported. The analysis showed that the average molecular weight of aminated lignin produced in line with example 1 was about 9000 g/mol.

Example 2

Preparing a Hemp Fiber Reinforced Composite

In this example fiber reinforced composite was produced. The following components and their amounts were used:
aminated lignin 15 g
Epilox® L285 17 g
hemp fibers 10 g The aminated lignin was produced in accordance with example 1. The aminated lignin produced in line with example 1 contained less than 5 weight-% of carbohydrates and it had an average molecular weight of about 9000 g/mol. The properties of the aminated lignin produced enabled it to be used as a curing agent in the present example.

15 g of aminated lignin from example 1 was dispersed in 17 g of Epilox® L285 epoxy resin (Epilox® A19-00+ Epilox® P 13-20) in glass. The temperature was kept under 40° C. Hemp fibers were mixed into the reaction mixture for embedding said fibers therein. Then the reaction mixture was heated at a temperature of 125° C. for 24 hours during which crosslinks were formed between epoxy resin and aminated lignin.

The formation of crosslinking was determined by immersing a sample of the formed hemp fiber reinforced epoxy resin composite into THF solvent for different time periods. A sample of 10.4 g was immersed in 200 ml of solvent (THF) for 2 h, 6 h and 24 h at room temperature. After said periods, the solid residue was extracted and weighed. The results are presented in table 1. According to the results, the material formed was insoluble in THF and did not swell in solution.

From test results it was noted that the use of aminated lignin resulted in crosslinks being formed with epoxy resin, i.e. aminated lignin was able to act as a curing agent curing the epoxy resin resulting in a fiber reinforced resin composite being formed.

TABLE 1

Extraction test in THF

| | Extraction time in THF | | | |
|---|---|---|---|---|
| | 0 h | 2 h | 6 h | 24 h |
| Epoxy resin composite formed in accordance with example 2 | 10.4 g | 10.4 g | 10.3 g | 9.9 g |

Example 3

Preparing a Glass Fiber Reinforced Composite

In this example fiber reinforced composite was produced. The following components and their amounts were used:

| | |
|---|---|
| aminated lignin | 60 g |
| epoxy resin | 120 g |
| unmodified lignin | 80 g |
| triethylenetetraamine (TETA) | 15 g |
| reactive diluent (Epilox ® P 13-20) | 20 g |
| glass fibers | 100 g |

The aminated lignin was produced in accordance with example 1. The aminated lignin produced in line with example 1 contained less than 5 weight-% of carbohydrates and it had an average molecular weight of about 9000 g/mol. The properties of the aminated lignin produced enabled it to be used as a curing agent in the present example.

60 g of aminated lignin from example 1 was mixed with 15 g of TETA. 120 g of Epilox® epoxy resin (Epilox® A18-00) and 20 g Epilox® P 13-20 and 80 g of unmodified lignin were mixed thoroughly in a mixer. The mixture comprising aminated lignin was then added to the mixture comprising epoxy resin and mixed thoroughly to form a homogenous mixture. The temperature was kept under 50° C. Then glass fibers were mixed into the mixture for embedding said fibers therein. The formed mixture was heated at a temperature of 115° C. in a mold during which crosslinks were formed between epoxy resin and aminated lignin as well as between unmodified lignin and aminated lignin.

In a similar manner as described for example 2 above, a sample of the formed glass fiber reinforced epoxy resin composite was subjected to an extraction test in THF. From test results (see table 2) it was noted that aminated lignin efficiently cured the epoxy resin and also formed crosslinks with the unmodified lignin. From the test results it was also noted that the amount of TETA, i.e. a traditional curing agent, could be replaced with aminated lignin without affecting the curing properties. It was also noted that the use of aminated lignin allowed up to 40% of the usually used amount of epoxy resin to be replaced with a bio-based material, i.e. unmodified lignin, without affecting the properties of the final composite.

TABLE 2

Extraction test in THF

| | Extraction time in THF | | | |
|---|---|---|---|---|
| | 0 h | 2 h | 6 h | 24 h |
| Epoxy resin composite formed in accordance with example 3 | 5.8 g | 5.8 g | 5.8 g | 5.6 g |

Example 4

Preparing a Laminate Using Pre-Impregnated Glass Fiber Fabrics

| | |
|---|---|
| dicyanodiamide (DICY) | 2 g |
| aminated lignin | 15 g |
| DGEBA-based epoxy prepolymer | 100 g |
| imidazole (accelerator) | 0.1 g |
| acetone or propyl alcohol | 40 g |
| glass fiber matts | 5 layers |

The aminated lignin was produced in accordance with example 1. The aminated lignin produced in line with example 1 contained less than 5 weight-% of carbohydrates and it had an average molecular weight of about 9000 g/mol. The properties of the aminated lignin produced enabled it to be used as a curing agent in the present example.

15 g of aminated lignin, 2 g of DICY, 100 g of epoxy resin, 0.1 g of imidazole and 40 g of acetone or propyl alcohol were mixed thoroughly. The formed resin matrix was used to impregnate glass fiber cloths to yield a prepreg with suitable properties for lamination. The epoxy resin, aminated lignin and DICY constituted about 45 weight-% of the formed prepreg, and glass fibers (55 weight-%), constructed in layers, served as the reinforcements.

Laminates were produced using five layers of the prepreg. The constructions were pressed at a pressure of 12 bar for 70 minutes at a temperature of 175° C. during which crosslinks were formed between epoxy resin and aminated lignin.

From test results it was noted that aminated lignin efficiently cured the epoxy resin. From test results it was also noted that the use of aminated lignin allowed the replacement of conventional petroleum based curing agent, e.g. DICY, without affecting the properties of the final composite.

In table 3 the properties of different glass fiber composites are compared and especially the properties of a glass fiber composite produced using a conventional curing agent are compared to the properties of glass fiber composites produced by using aminated lignin.

TABLE 3

Properties of different glass fiber composites

| | Thickness of the samples | Tensile stress in MPa | Youngs Modulus in MPa |
|---|---|---|---|
| Glass fber composite produced with a conventional curing agent | 1.8 mm | 170 | 10600 |
| Glass fiber composite produced in accordance with example 4 | 1.9 mm | 160 | 9700 |
| Glass fiber composite produced in accordance with example 4 with 10 weight-% of epoxy resin replaced with unmodified lignin | 1.9 mm | 147 | 9400 |

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A fiber reinforced composite comprising a reinforcing constituent of fibers embedded in a resin matrix, characterized in that the resin matrix comprises epoxy resin cross-linked with aminated lignin, and contains less than 5 weight-% of lignin based carbohydrates, wherein the aminated lignin is lignin that has been subjected to an amination reaction with polyamine.

2. The fiber reinforced composite of claim 1, wherein the resin matrix contains less than 1.5 weight-% of lignin based carbohydrates.

3. The fiber reinforced composite of claim 2, wherein the resin matrix further comprises unmodified lignin crosslinked with aminated lignin.

4. The fiber reinforced composite of claim 2, wherein the weight ratio of aminated lignin to epoxy resin is 1:10 to 3:2.

5. The fiber reinforced composite of claim 2, wherein the weight ratio of aminated lignin to epoxy resin is 1:6 to 1:1.

6. The fiber reinforced composite of claim 1, wherein the resin matrix further comprises unmodified lignin crosslinked with aminated lignin.

7. The fiber reinforced composite of claim 6, wherein the weight ratio of unmodified lignin to epoxy resin is 1:20 to 1:1.

8. The fiber reinforced composite of claim 6, wherein the weight ratio of aminated lignin to epoxy resin is 1:10 to 3:2.

9. The fiber reinforced composite of claim 6, wherein the weight ratio of unmodified lignin to epoxy resin is 1:10 to 2:3.

10. The fiber reinforced composite of claim 6, wherein the weight ratio of aminated lignin to epoxy resin is 1:6 to 1:1.

11. The fiber reinforced composite of claim 1, wherein the weight ratio of aminated lignin to epoxy resin is 1:10 to 3:2.

12. A fiber reinforced composite comprising a reinforcing constituent of fibers embedded in a resin matrix produced by a method comprising the steps of (a) forming a resin matrix by mixing epoxy resin and aminated lignin containing less than 5 weight-% of carbohydrates and mixing the resin matrix with fibers; and (b) heating the composition formed in step a) at a temperature of 40-180° C. for crosslinking epoxy resin and aminated lignin, wherein the aminated lignin is lignin that has been subjected to an amination reaction with polyamine.

* * * * *